United States Patent [19]

Kalix

[11] Patent Number: 5,261,437
[45] Date of Patent: Nov. 16, 1993

[54] METHOD AND APPARATUS FOR MONITORING AND ANALYZING RECIRCULATION CONTROL SYSTEM PERFORMANCE

[75] Inventor: David A. Kalix, Philadelphia, Pa.

[73] Assignee: Keystone International Holdings Corp., Wilmington, Del.

[21] Appl. No.: 967,227

[22] Filed: Oct. 27, 1992

Related U.S. Application Data

[63] Continuation-in-part of Ser. No. 712,396, Jun. 10, 1991, abandoned.

[51] Int. Cl.⁵ .................. F16K 37/00; G01L 17/00
[52] U.S. Cl. ........................... 137/1; 73/168;
        137/14; 137/115; 137/552; 137/557
[58] Field of Search .................. 73/168; 137/115, 116,
        137/117, 1, 14, 552, 557

[56] References Cited

U.S. PATENT DOCUMENTS

| | | | |
|---|---|---|---|
| 2,100,997 | 11/1937 | Russel | 137/116 |
| 2,155,558 | 4/1939 | Laughlin | 137/116 |
| 2,764,177 | 1/1952 | Paasche | 137/552 X |
| 3,757,811 | 9/1973 | Broker | 137/116 |
| 3,779,457 | 12/1973 | Cornyn, Jr. | |
| 4,523,286 | 6/1985 | Koga et al. | 137/557 X |
| 4,646,556 | 3/1987 | Courcoux et al. | |
| 4,694,693 | 9/1987 | Gerlowski | |
| 4,711,266 | 12/1987 | Leiber | |
| 4,779,639 | 10/1988 | Loos et al. | 137/117 |
| 4,891,948 | 1/1990 | Kure-Jensen et al. | |
| 4,891,975 | 1/1990 | Charbonneau et al. | |
| 4,896,101 | 1/1990 | Cobb | |
| 4,941,502 | 7/1990 | Loos et al. | |
| 4,967,783 | 11/1990 | Loos | 137/116 |
| 4,976,144 | 12/1990 | Fitzgerald | 137/487.5 |

FOREIGN PATENT DOCUMENTS 1030641  5/1966  United Kingdom ............. 137/116

*Primary Examiner*—Stephen M. Hepperle
*Attorney, Agent, or Firm*—John W. Logan, Jr.

[57] ABSTRACT

A method and apparatus for monitoring and analyzing the performance of a recirculation control system are disclosed. According to the invention, the pressure of the liquid passing through the control system is measured directly by pressure and differential pressure transducers at the main inlet, main outlet, and, within the regulation means of the control system. Where the means for regulating the flow of liquid to the recirculation outlet comprises a piston within a piston chamber, the pressure of the liquid within the regulating means is measured in the piston chamber. The pressure data is analyzed to determine valve performance.

22 Claims, 4 Drawing Sheets

METHOD AND APPARATUS FOR MONITORING AND ANALYZING RECIRCULATION CONTROL SYSTEM PERFORMANCE

Cross Reference to Related Application

This application is a continuation-in-part of application Ser. No. 712,396 filed Jun. 10, 1991, now abandoned.

BACKGROUND OF THE INVENTION

The present invention is directed to recirculation control systems or valves, and more particularly to a method and apparatus for monitoring the performance of such systems or valves.

Recirculation control systems are frequently used in centrifugal pump applications to prevent overheating of the pump. Overheating is prevented by maintaining a minimum flow through the pump at all times. During periods of low demand downstream of the pump, the recirculation control system will automatically recirculate enough fluid from the output of the pump to maintain at least the minimum flow through the pump. The recirculated fluid is then directed back to a reservoir.

A recirculation control system may comprise a combination of several valves or a single recirculation control valve. One such valve, disclosed in U.S. Pat. No. 4,967,783 to Loos which is hereby incorporated by reference, is totally self-contained and includes a flow sensing element, a bypass control valve, and a multistage pressure letdown valve all within one body. Other recirculation control valves are disclosed in U.S. Pat. Nos. 4,779,639 and 4,941,502 which are also hereby incorporated by reference.

One disadvantage of a recirculation control system or valve is that it is difficult for plant operating personnel to confirm that it is performing correctly. Unnecessary disassembly and inspection is often performed to inspect specific components. Even disassembly, however, can not confirm that a valve is actually operating properly under all system conditions. In addition, valve inspection and repair is normally performed by trained factory representatives. This presents additional cost and scheduling problems.

Proper performance of recirculation systems at all times is critical to protect the pump. Accordingly, an object of this invention is to monitor valve performance while the valve is in operation.

Another object is to permit monitoring of recirculation control valves in remote locations.

A further object of the invention is to provide a valve performance indicator.

Another object of the invention is to permit continuous monitoring of the valve.

SUMMARY OF THE INVENTION

A method and apparatus for monitoring and analyzing the performance of a recirculation control system are disclosed. According to the invention, the pressure of the liquid passing through the control system is measured directly by pressure and differential pressure transducers at the main inlet, main outlet and along the recirculation path of the control system. Where the means for regulating the flow of liquid to the recirculation outlet comprises a piston within a piston chamber, the pressure along the recirculation path is measured within the piston chamber. The pressure data is transmitted to an analyzer for determining valve performance.

The present invention comprises a method for monitoring the performance of a recirculation control system through which a liquid is directed where the control system has a main inlet, a main outlet and a recirculation outlet. The method of the invention comprises obtaining data on the pressure of the liquid passing through the system at the main inlet of the system, obtaining data on the pressure of the liquid passing through the system at the main outlet of the system, and obtaining data on the pressure of the liquid passing through the recirculation path of the system. Where the recirculation control system has a means for regulating the flow of liquid into the recirculation outlet comprising a piston within a piston chamber, the pressure along the recirculation path is measured within the piston chamber during the operation of the system. The obtained pressure data is analyzed to determine valve performance.

The present invention also comprises an apparatus for monitoring and analyzing the performance of a recirculation control system. The apparatus comprises a means for obtaining data on the pressure of the liquid passing through the system at the main inlet of the system, a means for obtaining data on the pressure of the liquid passing through the system at the main outlet of the system, and a means for obtaining data on the pressure of the liquid passing through the recirculation path of the system. Where the recirculation control system has a means for regulating the flow of liquid into the recirculation outlet comprising a piston within a piston chamber, the apparatus obtains the pressure of the liquid passing through the recirculation path at the piston chamber during the operation of the system. The obtained pressure data is analyzed to determine valve performance.

BRIEF DESCRIPTION OF THE DRAWINGS

The foregoing summary, as well as the following detailed description, will be better understood when read in conjunction with the drawings appended hereto. For the purpose of illustrating the invention, there is shown in the drawings an embodiment which is presently preferred, it being understood however, that this invention is not limited to the precise arrangement and instrumentalities shown.

DESCRIPTIONS OF THE PREFERRED EMBODIMENTS

The process of the present invention comprises monitoring critical parameters of recirculation control system performance during system operation. These parameters are the pressure of the liquid flowing through the main inlet of the system, the pressure of the liquid flowing through the main outlet of the system or the differential between the inlet and outlet pressures, and the pressure of the liquid flowing through the recirculation outlet of the system. In the case of a recirculation control valve having a pilot valve and piston arrangement for regulating the flow of fluid through the recirculation outlet, such as the one disclosed in U.S. Pat. No. 4,967,783, it is preferable to measure and monitor the pressure of the liquid in the piston chamber rather than through the recirculation outlet. The data on the pressure of the liquid is preferably collected directly by pressure and differential pressure transducers and transmitted to an analyzing device wherein the data is analyzed to determine valve performance.

Figure 2:
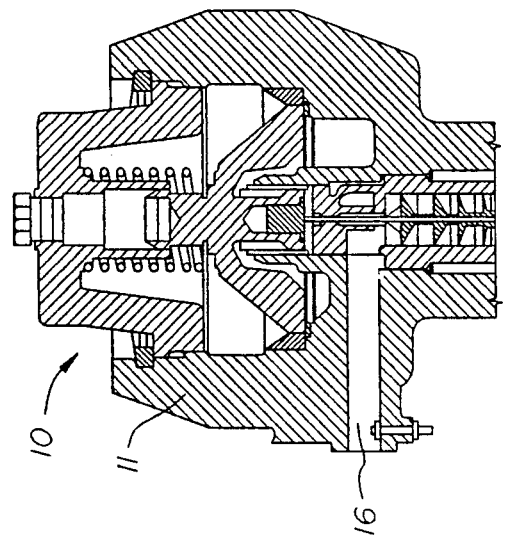
FIG. 2 is a section view of the recirculation valve along line 2—2 of FIG. 1 showing the recirculation outlet and the position of the pressure sensor therein.
Figure 1:
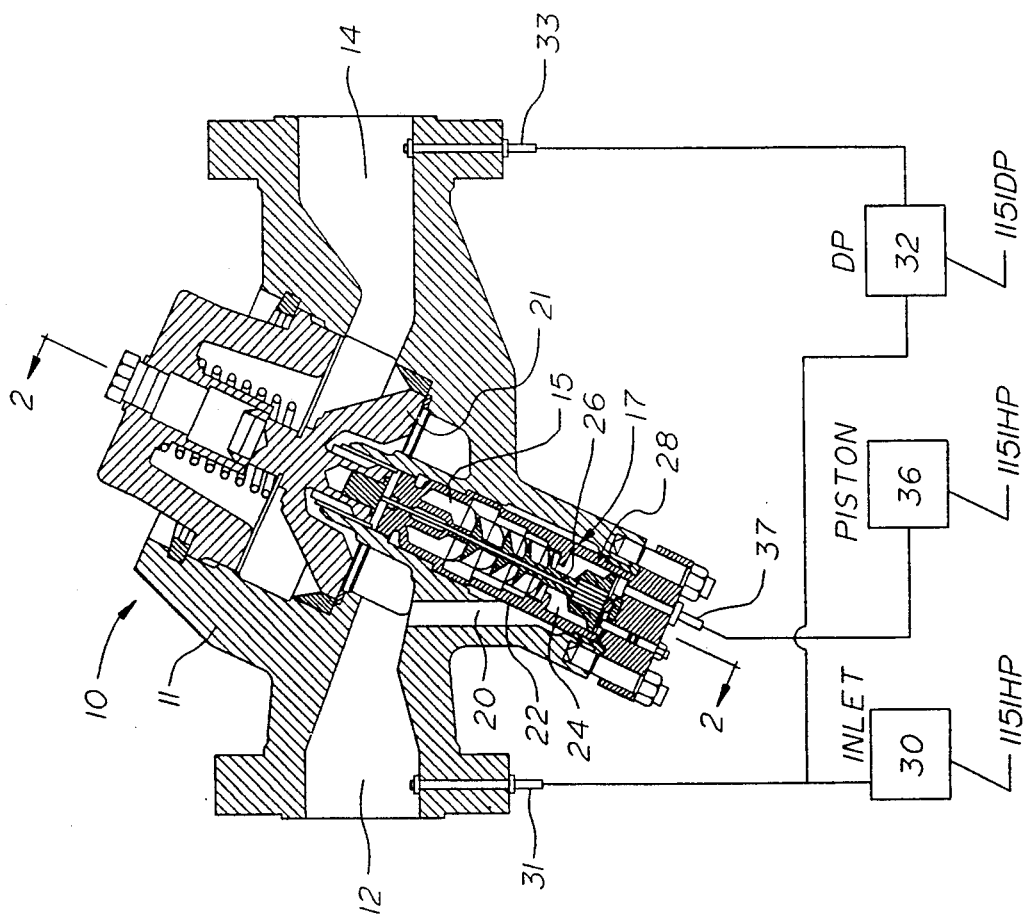
FIG. 1 is a schematic and section view of the recirculation valve of the preferred embodiment.

Referring to FIGS. 1 and 2, a recirculation control valve monitoring apparatus of the present invention is shown. The valve assembly 10 includes a main housing 11 having a main inlet 12 and a main outlet 14. The main inlet 12 is connected to the pilot valve assembly 17 via a recirculation conduit 20.

Recirculation conduit 20 communicates with sleeve 22 housing slidable piston 26 which in turn communicates with recirculation outlet 16 via recirculation port 15. When downstream demand is present, i.e., corresponding to a decrease in outlet pressure at main outlet 14, the pilot valve assembly 28 is actuated causing piston chamber 24 to fill with liquid. As piston chamber 24 fills with liquid, slidable piston 26 is thrust upward towards seats on sleeve 22 thereby regulating the flow of liquid to the recirculation outlet 16.

Pressure transducer 30 senses the pressure of the liquid at the main inlet 12 through port 31 and converts and transmits this data as an electronic signal. Similarly, pressure transducer 36 senses the pressure of the liquid at piston chamber 24 through port 37. Differential pressure transducer 32 measures the difference between the pressures of the liquid at the main inlet 12 through port 31 and main outlet 14 through port 33. Any suitable pressure transducer or differential pressure transducer may be used such as Models 1151HP and 1151DP available from Rosemount, Inc. of Eden Prairie, Mo.

Figure 3:
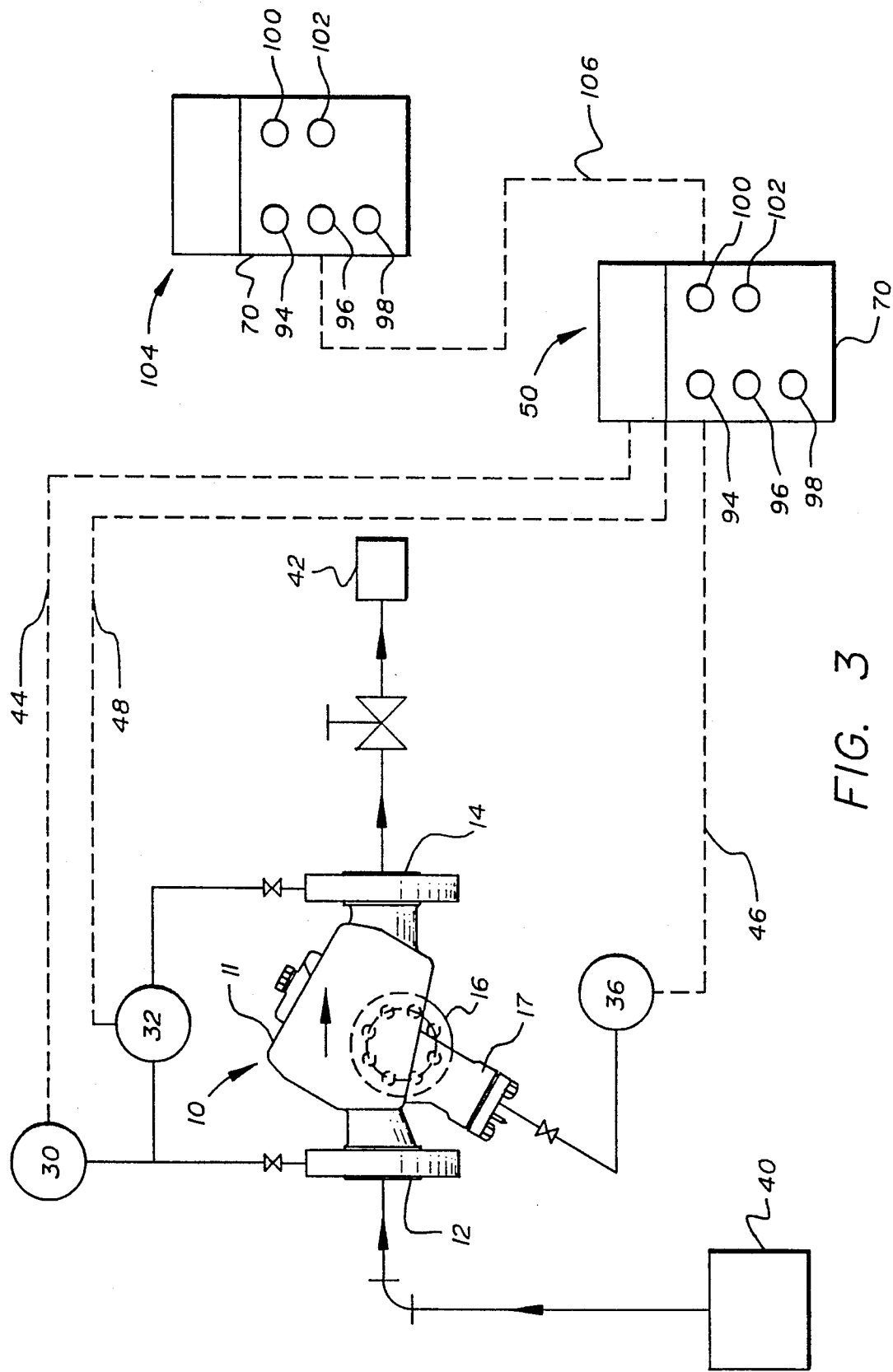
FIG. 3 is a schematic view of a combined valve monitoring and analysis system.

Referring to FIG. 3 of the drawings, a recirculation control system and monitoring apparatus incorporating the recirculation control valve of FIGS. 1 and 2 is shown. Fluid from pump 40 enters recirculation valve 10 through inlet 12 and exits through outlet 14 to satisfy the downstream fluid flow demand of user 42.

It is understood that the function of the recirculation control valve is to maintain at least the required minimum flow rate through pump 40 to prevent pump overheating. When the fluid flow demand of downstream user 42 falls below the minimum flow requirement of pump 40, recirculation valve 10 directs fluid through recirculation valve outlet 16 in addition to the fluid flow through main outlet 14. Sufficient fluid is diverted to recirculation outlet 16 so that the combined flow rates through outlets 14 and 16 is at least the minimum flow required for pump 40. Through this process, the flow through inlet 12, and thus through pump 40, can always be maintained above the minimum flow rate by directing the additional flow required to recirculation outlet 16.

Inlet pressure transducer 30, differential pressure transducer 32, and piston pressure transducer 36 transmit the respective pressure data through suitable transmission wires as represented by dotted lines 44, 46, and 48, respectively, to recirculation valve performance analyzer 50. Analyzer 50 receives and analyzes the transmitted pressure data, and indicates valve performance.

Figure 4:
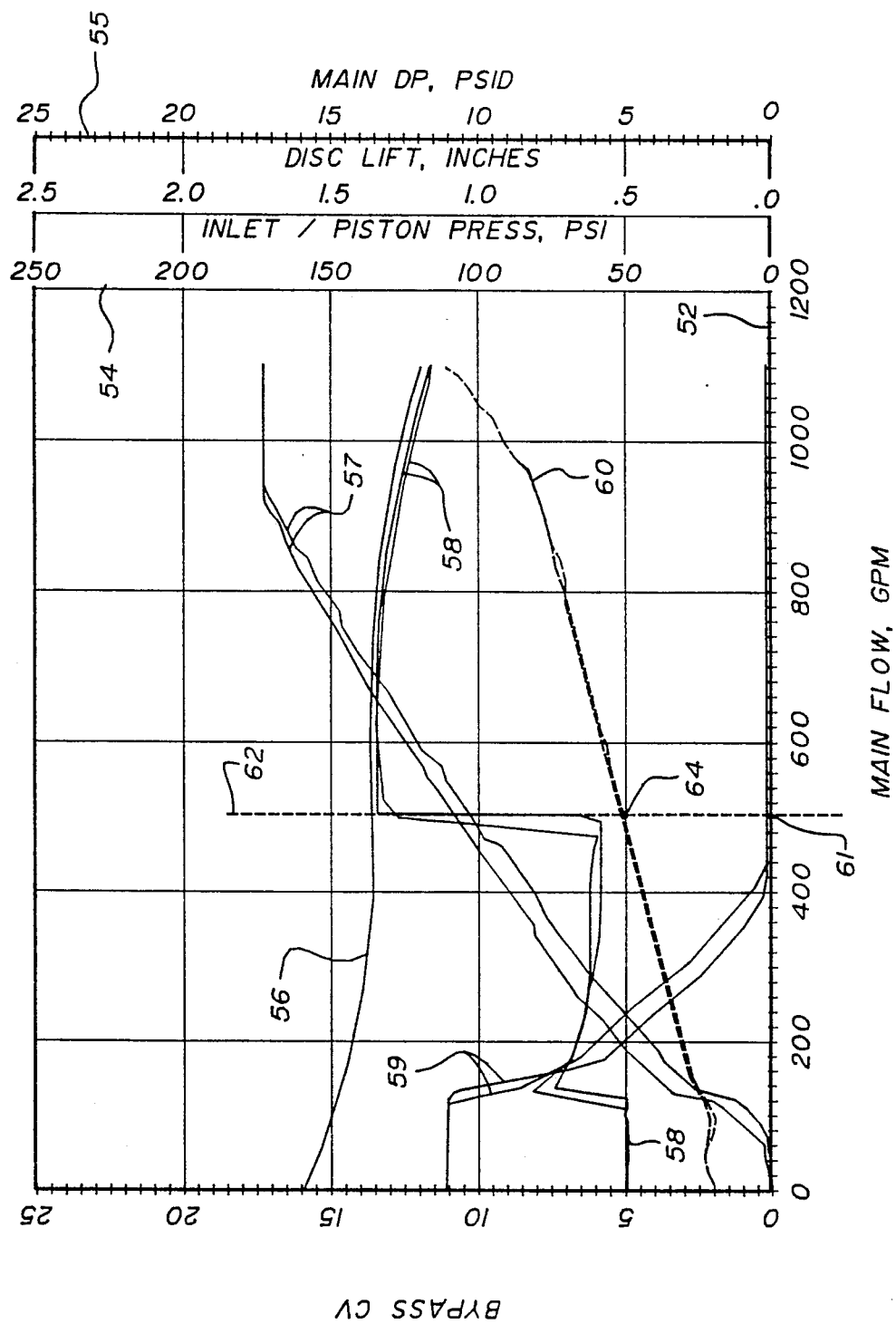
FIG. 4 is a graphical representation of the pressure readings of the valve of FIG. 1 during valve operation.

The pressure versus flow rate curves plotted in FIG. 4 of the drawings is an illustrative example of the characteristics of the recirculation control valve of the preferred embodiment shown in FIGS. 1 and 2. The curves represent the expected fluid pressure data readings as a function of the fluid flow rate through recirculation valve outlet 14. The horizontal axis 52 represents the main flow through outlet 14 in units of gallons per minute and is referred to as the "main flow." The vertical axes 54 and 55 represents the fluid pressure in lbs. per square inch.

Inlet pressure curve 56 represents the fluid pressure at main inlet 12 as a function of the main flow through outlet 14 and transmitted by transducer 30. Piston pressure curve 58 represents the pressure of the fluid in piston chamber 24 as a function of the main flow and transmitted by transducer 36. Similarly, differential pressure curve 60 represents the differential pressure between inlet 12 and outlet 16 as a function of the main flow through outlet 14 and transmitted by transducer 32. Curve 57 represents the lift of disc 21 inside valve 10 and is shown simply for reference. Curve 59 represents the bypass Cv of valve 10 as a function of main flow and is also shown simply for reference.

As an illustrative example, the recirculation valve of the present embodiment is designed to begin diverting fluid through recirculation outlet 16 when the main flow through outlet 14 falls below 500 gpm as represented by point 61.

Dotted line 62 is extended vertically from 500 gpm through all three pressure curves to indicate the expected pressure readings from those locations at the flow rate below which 500 gpm recirculation is necessary; above 500 gpm no recirculation is necessary. Line 62 intercepts differential pressure curve 60 at point 64 corresponding to a reading of 5 psid and will be referred to as the differential pressure set point ("dp set point"). Any differential pressure reading equal to the dp set point of 5 psid or higher indicates that the main flow through outlet 14 is at least equal to or higher than the required minimum flow rate of 500 gpm and thus no recirculation through outlet 16 is required.

Comparing inlet pressure curve 56 with piston pressure curve 58, it is seen that whenever the main flow through outlet 14 is at the minimum flow rate of 500 gpm or higher (curves 56 and 58 viewed to the right of dotted line 62) the piston pressure 58 is substantially similar to that of inlet pressure 56. But when the main flow falls below the minimum flow of 500 gpm (to the left of line 62), the piston pressure 58 drops to less than half of the inlet pressure 56. This drastic change in piston pressure is a direct result of flow being directed through recirculation outlet 16 when the main flow falls below the minimum flow rate.

These curves can be used to analyze the performance of valve 10. First, the state of the main flow through outlet 14 is determined. Whenever the differential pressure reading is greater than the dp set point 64 (5 psid in the present example), the main flow through outlet 14 is higher than the required minimum flow rate and thus no recirculation is required. This state is referred to as "high flow." Likewise, whenever the differential pressure reading is lower than the dp set point 64, main flow is lower than the minimum flow rate required and it is necessary to recirculate fluid through outlet 16. This state is referred to as "low flow."

Once the state of flow through outlet 14 is known, the actual performance of valve 10 is determined. Where the state of main flow through outlet 14 is high (no recirculation required], the piston pressure should be substantially similar to the inlet pressure, as shown by curves 56 and 58 to the right of dotted line 62. If piston pressure is lower than inlet pressure, it is likely that fluid is leaking through the pilot valve assembly of valve 10 and through recirculation outlet 16. If the state of the flow is high flow and piston pressure is substantially half or less than half of inlet pressure, the recirculation bypass valve is open.

Likewise, where the state of the flow is low flow (recirculation required), piston chamber pressure should be one-half of inlet pressure or less as shown by curves 56 and 58 to the left of dotted line 62. If the piston pressure is not that low, the recirculation bypass has failed closed, no fluid is recirculated, and the minimum flow required through pump 40 will not be maintained.

It should be understood that the curves illustrated in FIG. 4 are for illustrative purposes only. Each recirculation valve of the type in the preferred embodiment will have a particular dp set point 64 depending on the valve model and the minimum flow requirements of the pump to be protected.

Figure 5:
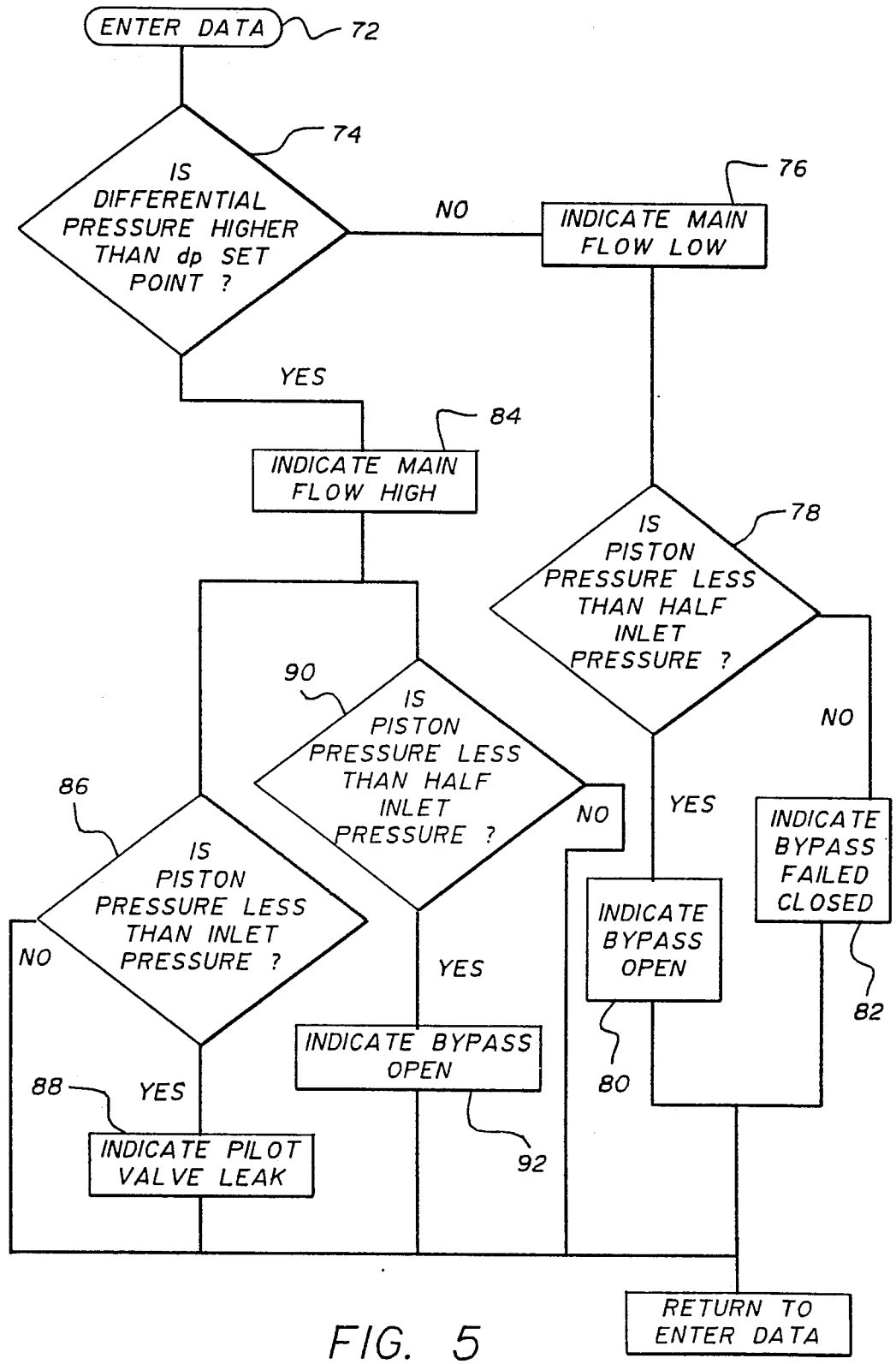
FIG. 5 is a flow chart illustrating the logic sequence for analyzing the pressure readings of the valve of FIG. 1.

Referring to FIGS. 3 and 5, analyzer 50 will now be described. The obtained pressure data of the inlet pressure, the piston pressure and the differential pressure is transmitted to analyzer 50 through wires represented by dotted lines 44, 46 and 48. Those skilled in the art recognize that there are many methods for transmitting data including pressure signals, electrical analog signals, and electrical digital signals, as well as transmission media such as wires, fiber optics or radio signals. The method of transmission used herein is analog over wires.

Analyzer 50 comprises indicator light panel 70 including lights 94, 96, 98, 100, and 102, and internal electric circuits (not shown) which analyze the pressure data in accordance with a programmed logic operation as shown in FIG. 5 which will now be described.

Referring to FIG. 5, usual flow diagram connections are followed. Specifically, a diamond shaped block represents a logical operation, such as a comparison of data, and a rectangular shaped block represents a step in a sequence of steps, such as illuminate a light.

The logic operation begins by entering all three pressure readings at block 72. At this point, a determination is made in decision block 74 as to whether the main flow through valve 10 and outlet 14 is high or low. This is accomplished by comparing the differential pressure reading with the preset dp set point. If differential pressure is lower, the flow chart proceeds to block 76. If differential pressure is higher, the flow chart proceeds to block 84. For the moment, however, it will be assumed that the differential pressure is lower and the flow chart proceeds at 76.

At block 76, Main Flow Low Light 94 is illuminated on panel 70 to indicate that recirculation through outlet 16 is required to maintain minimum flow. In decision block 78, piston pressure is compared to one half of the inlet pressure. If piston pressure is less than one half inlet pressure, the flow chart proceeds to block 80 wherein Bypass Open Light 96 is illuminated to indicate that the recirculation valve is working properly. But if, instead, piston pressure is not less than one half inlet pressure, the flow chart proceeds to block 82 wherein light 102 is illuminated to indicate that the Bypass has Failed Closed and thus the valve is not properly recirculating fluid.

Returning to block 74, it will now be assumed that the state of flow is High Flow and that the flow chart proceeds to block 84. Block 84 illuminates light 100 to indicate that the Main Flow is High (no recirculation required). The flow path continues with both blocks 86 and 90.

At decision block 86, a determination is made as to whether the piston pressure is lower than the inlet pressure. If the determination is resolved in the affirmative, the flow path proceeds to block 88 wherein light 98 is illuminated to indicate a pilot valve leak. If block 86 is not resolved in the affirmative, this part of the flow path ends.

Returning to block 90, a determination is made as to whether the piston pressure reading is less than half of the inlet pressure reading. If this determination is resolved in the affirmative, the flow path proceeds to block 92 wherein light 96 is illuminated to indicate that the bypass is open. Illuminated light 96, in combination with illuminated light 100, indicates a serious valve problem.

It is recognized that this logic operation is continuous. As the three pressure readings are continually monitored and analyzed, the logic operation is continuously repeated. As the pressure readings change, the indication lights also change. The electrical circuits of the preferred embodiment for carrying out the logic operation as disclosed receive the data as analog signals from transmitters 30, 32 and 36. The signals are then converted to digital signals and processed through combinational logic circuits to give the desired output or indication. Those skilled in the art readily understand how to construct such a device as well as alternative methods of carrying out the logic operation including inputting the data into a programmable microprocessor. Alternative methods and devices for indicating or displaying the results of the logic operation are also well known and include displaying such results on a video monitor.

Analyzer 50 can be located locally or remotely in relation to valve 10. Furthermore, a remote analyzer 104 can be used in addition to analyzer 50, receiving the necessary signals from wires represented by dotted line 106. Appropriate labels for each indicating light can also be added to the panel 70.

It will be recognized by those skilled in the art that changes may be made to the above described embodiment of the invention without departing from the broad inventive concepts thereof. It is understood, therefore, that this invention is not limited to the particular embodiment disclosed, but is intended to cover all modifications which are within the scope and spirit of the invention as defined by the appended claims.

What is claimed is:

1. A method for monitoring and analyzing the performance of a recirculation control system, said method comprising:

provide a control system main inlet through which a minimum flow rate is to be maintained;

providing a control system main outlet;

providing a control system recirculation outlet;

obtaining pressure data of the liquid passing through the system at the main inlet during the operation of the system;

obtaining differential pressure data between the liquid pressures at said main inlet and said main outlet during the operation of the system;

obtaining pressure data of the liquid passing through the system and directed to the recirculation outlet during the operation of the system; and employing said obtained data to verify performance of the system.

2. A method according to claim 1, wherein the flow of fluid through said recirculation outlet is regulated by a piston within a piston chamber, and wherein said pressure data obtained of the liquid passing through the system and directed to the recirculation outlet is the pressure of the liquid within said piston chamber during the operation of the system.

3. A method according to claim 2 wherein the step of employing said obtained data comprises the steps of:

comparing said obtained differential pressure with a predetermined value;

comparing said obtained piston pressure with said obtained inlet pressure; and using said comparisons to verify valve performance.

4. A method according to claim 3 wherein the step of employing said obtained data is carried out by an analyzer performing a logic operation.

5. A method according to claim 3 further comprising the step of illuminating lights on a panel to indicate valve performance.

6. A method according to claim 3 wherein the step of employing said obtained data is carried out by a programmed microprocessor performing a logic operation.

7. An apparatus for monitoring and analyzing the performance of a recirculation control system, said apparatus comprising:

a main inlet through which a minimum flow rate is to be maintained;

a main outlet;

a recirculation outlet;

means for obtaining pressure data of the liquid passing through the system at the main inlet during the operation of the system;

means for obtaining differential pressure data between the liquid pressures at said main inlet and said main outlet during the operation of the system;

means for obtaining pressure data of the liquid passing through the system and directed to the recirculation outlet during the operation of the system; and an analyzer for analyzing said obtained data to determine system performance.

8. An apparatus according to claim 7, wherein the recirculation control system further comprises a means for regulating the flow of liquid into the recirculation outlet comprising a piston within a piston chamber, and wherein said obtained pressure data of the liquid passing through the system and directed to the recirculation outlet is the pressure of the liquid within the piston chamber.

9. An apparatus according to claim 7, wherein the recirculation system is a recirculation control valve.

10. An apparatus according to claim 8, wherein the recirculation control system is a recirculation control valve.

11. An apparatus according to claim 8, wherein the analyzer performs the following steps:

comparing said obtained differential pressure with a predetermined value;

comparing said obtained piston chamber pressure with said obtained inlet pressure;

using the comparison of the differential pressure with the predetermined value and the comparison of the piston chamber pressure with the inlet pressure to determine valve performance.

12. An apparatus according to claim 11 wherein the analyzer performs said steps according to a logic operation.

13. An apparatus according to claim 8 further comprising an illuminating panel for indicating valve performance.

14. A method for monitoring performance of a recirculation control system, comprising the steps of:

directing fluid through a recirculation control system comprising a main inlet wherethrough a minimum flow rate is maintained, a main outlet, a recirculation outlet, and a piston within a piston chamber for regulating the flow of fluid through the recirculation outlet;

obtaining pressure data of the liquid passing through said main inlet;

obtaining pressure data of the liquid passing through said main outlet;

obtaining pressure data of the liquid within said piston chamber; and employing said obtained data to analyze the performance of the recirculation system.

15. A method for monitoring performance of a recirculation control system in accordance with claim 14 wherein said pressure data of the liquid passing through the main outlet is a differential pressure between the liquid pressures at said main inlet and said main outlet.

16. A method for monitoring performance of a recirculation control system in accordance with claim 14 wherein the step of employing said obtained data comprises the steps of:

calculating a differential pressure between said obtained pressure of the liquid passing through the main inlet and said obtained pressure of the liquid passing through the main outlet;

comparing said calculated differential pressure with a predetermined differential pressure set point;

comparing said obtained piston chamber pressure with said obtained inlet pressure; and using the comparison of said differential pressure with said differential set point and the comparison of said piston chamber pressure with said inlet pressure to determine system performance.

17. A method for monitoring performance of a recirculation control system in accordance with claim 15 wherein the step of employing said obtained data comprises the steps of:

comparing said calculated differential pressure with a predetermined differential pressure set point;

comparing said obtained piston chamber pressure with said obtained inlet pressure; and using the comparison of said differential pressure with said differential set point and the comparison of said piston chamber pressure with said inlet pressure to determine system performance.

18. An apparatus for monitoring the performance of a recirculation control system, comprising:

a recirculation control system comprising a main inlet wherethrough a minimum flow rate is maintained, a main outlet, a recirculation outlet, and a piston within a piston chamber for regulating the flow of liquid into said recirculation outlet;

means for obtaining pressure data of the liquid passing through said main inlet;

means for obtaining pressure data of the liquid passing through said main outlet;

means for obtaining pressure data of the liquid within said piston chamber.

means for analyzing the obtained data to determine system performance.

19. An apparatus for monitoring the performance of a recirculation control system according to claim 18, wherein said obtained pressure data of the liquid passing through the main outlet is a differential pressure between the liquid pressures at said main inlet and said main outlet.

20. An apparatus for monitoring the performance of a recirculation control system according to claim 18 wherein said analyzer means comprises a logic operator device.

21. An apparatus for monitoring the performance of a recirculation control system according to claim 19 wherein said analyzer means comprises a logic operator device.

22. A recirculation control valve for use with a recirculation control monitoring system, comprising:

a main inlet wherethrough a minimum flow rate is maintained;

a main outlet;

a recirculation outlet;

a piston within a piston chamber for regulating the flow of liquid through said recirculation outlet;

means for obtaining pressure data of the liquid passing through said main inlet;

means for obtaining pressure data of the liquid passing through said main outlet;

means for obtaining pressure data of the liquid within said piston chamber.

* * * * *